US008646563B2

(12) United States Patent
Voth et al.

(10) Patent No.: US 8,646,563 B2
(45) Date of Patent: Feb. 11, 2014

(54) WORK MACHINE WITH COMPACT GENERATOR AND HYDRAULIC DRIVE ASSEMBLY

(75) Inventors: Danny G. Voth, Liberty, KS (US); Kyle K. McKinzie, Altamont, KS (US); Galen R. Love, Cherryvale, KS (US)

(73) Assignee: Deere & Company, Moline, IL (US)

( * ) Notice: Subject to any disclaimer, the term of this patent is extended or adjusted under 35 U.S.C. 154(b) by 139 days.

(21) Appl. No.: 13/426,095

(22) Filed: Mar. 21, 2012

(65) Prior Publication Data

US 2013/0248274 A1    Sep. 26, 2013

(51) Int. Cl.
*B60K 6/10* (2006.01)
(52) U.S. Cl.
USPC ............... 180/291; 180/65.6; 903/952
(58) Field of Classification Search
USPC .................... 180/291, 65.6; 903/952
See application file for complete search history.

(56) References Cited

U.S. PATENT DOCUMENTS

| | | | | |
|---|---|---|---|---|
| 5,833,022 A | * | 11/1998 | Welke | 180/65.25 |
| 5,875,691 A | * | 3/1999 | Hata et al. | 74/661 |
| 6,116,364 A | * | 9/2000 | Taguchi et al. | 180/65.26 |
| 6,155,364 A | * | 12/2000 | Nagano et al. | 180/65.235 |
| 6,166,498 A | * | 12/2000 | Yamaguchi et al. | 318/34 |
| 6,457,314 B1 | * | 10/2002 | Shimizu et al. | 60/718 |
| 6,481,517 B1 | * | 11/2002 | Kobayashi et al. | 180/65.26 |
| 6,533,696 B1 | * | 3/2003 | Takenaka et al. | 475/150 |
| 6,575,865 B2 | * | 6/2003 | Takenaka et al. | 475/5 |
| 6,692,394 B2 | * | 2/2004 | Takenaka | 475/5 |
| 6,695,082 B2 | * | 2/2004 | Bitsche et al. | 180/65.25 |
| 6,715,291 B1 | * | 4/2004 | Liao | 60/698 |
| 6,729,423 B2 | * | 5/2004 | Kobayashi et al. | 180/65.21 |
| 7,445,573 B2 | * | 11/2008 | Grumbach et al. | 475/5 |
| 7,506,710 B2 | * | 3/2009 | Abe et al. | 180/65.25 |
| 7,568,539 B2 | * | 8/2009 | Abe et al. | 180/65.25 |
| 8,084,908 B2 | * | 12/2011 | Chiba | 310/102 R |
| 8,232,697 B2 | * | 7/2012 | Chiba et al. | 310/75 D |
| 2001/0017226 A1 | * | 8/2001 | Ohsawa | 180/65.2 |
| 2004/0072641 A1 | | 4/2004 | Nakamura | |
| 2004/0079565 A1 | * | 4/2004 | Bitsche et al. | 180/65.2 |
| 2005/0039572 A1 | * | 2/2005 | Friedmann | 74/661 |
| 2008/0318729 A1 | * | 12/2008 | Asao et al. | 477/5 |
| 2009/0302720 A1 | * | 12/2009 | Chiba | 310/75 R |
| 2013/0248274 A1 | * | 9/2013 | Voth et al. | 180/242 |

FOREIGN PATENT DOCUMENTS

| | | |
|---|---|---|
| DE | 19955069 A1 | 5/2001 |
| EP | 0556477 B1 | 1/1995 |
| JP | 4054225 A | 2/1992 |
| JP | 2001193474 A | 7/2001 |
| WO | 200240842 A1 | 5/2002 |

* cited by examiner

*Primary Examiner* — Jeffrey J Restifo

(57) ABSTRACT

A work machine in which the engine and power output system is to be contained within a minimal volume in an engine compartment. A gear housing is mounted to and receives the output of the internal combustion engine and has side by side gears meshing with a first input gear, one of which drives a generator and the other drives an internal lubricant pump as well as an external hydraulic pump. The gears are in substantially the same plane. The output of the generator is connected via a controller to a motor which drives a transmission system for driving the wheels of the vehicle. The gear housing permits placement of additional components within the engine compartment while taking up a minimum volume.

9 Claims, 2 Drawing Sheets

WORK MACHINE WITH COMPACT GENERATOR AND HYDRAULIC DRIVE ASSEMBLY

FIELD OF THE INVENTION

The present invention relates to work machines and more specifically to work machines incorporating motors and generators in the drive system.

BACKGROUND OF THE INVENTION

As the EPA requirements are being applied to off highway vehicles of the work machine type, there is an ever increasing demand placed on the propulsion system to produce sufficient power for vehicle movement and accessory loads as well as doing so with a high degree of fuel economy and newly required emission limit standards. These standards require many additional devices to provide an engine and aftertreatment system that meets the required levels of particulate and nitrous oxide emissions. One approach to help achieve these ends is to provide a generator driven by the diesel engine and coupled to an electric motor which, in turn, drives a standard propulsion system for the vehicle.

One of the problems in adopting this approach is that the existing transmission system for the vehicle, very often, needs to be retained in the power train so that the mounting and installation of the motor and generator, by their nature having significant volume, must present a difficult problem incorporating them and integrating them into the overall propulsion system.

Accordingly what is needed in the art is a system in which the motor and generator are compactly mounted within the propulsion system for a work vehicle.

SUMMARY

The invention, in one form, includes a work machine with a frame having a plurality of wheels supported by the frame. A transmission system is provided for connecting a rotary input to at least one of the ground wheels. An engine compartment is provided within the frame with the engine compartment being constrained in available space to provide a minimal overall volume. An internal combustion engine is mounted within the engine compartment and has a rotary power output shaft bounded by a flange which normally receives an engine bell housing. A housing having a flange corresponding to the engine flange is mounted on the engine flange and has an input shall journaled within the housing and connected at one end to the rotary power output shaft of the engine, with the input shaft having a first gear mounted to the input shaft. A second gear is journaled in housing about an axis parallel to the axis of the input shaft, with the second gear being substantially in the same plane and being driven by the first gear with the second gear having a first output shaft. A generator is mounted to the exterior of the housing and is driven by the first output shaft to produce an electrical output in response to the rotary power output of the internal combustion engine. A third gear is journaled in the housing about an axis parallel to the axis of the input shaft, with the first gear being substantially in the same plane and being driven by the first gear, the second gear having a second output shaft having an inner end contained within the housing and an outer end adapted to drive an externally mounted load. An electric motor is connected to the rotary input of the transmission and receives a controlled electrical input from the generator so that the generator and motor fit within a minimal volume.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION

Figure 1:
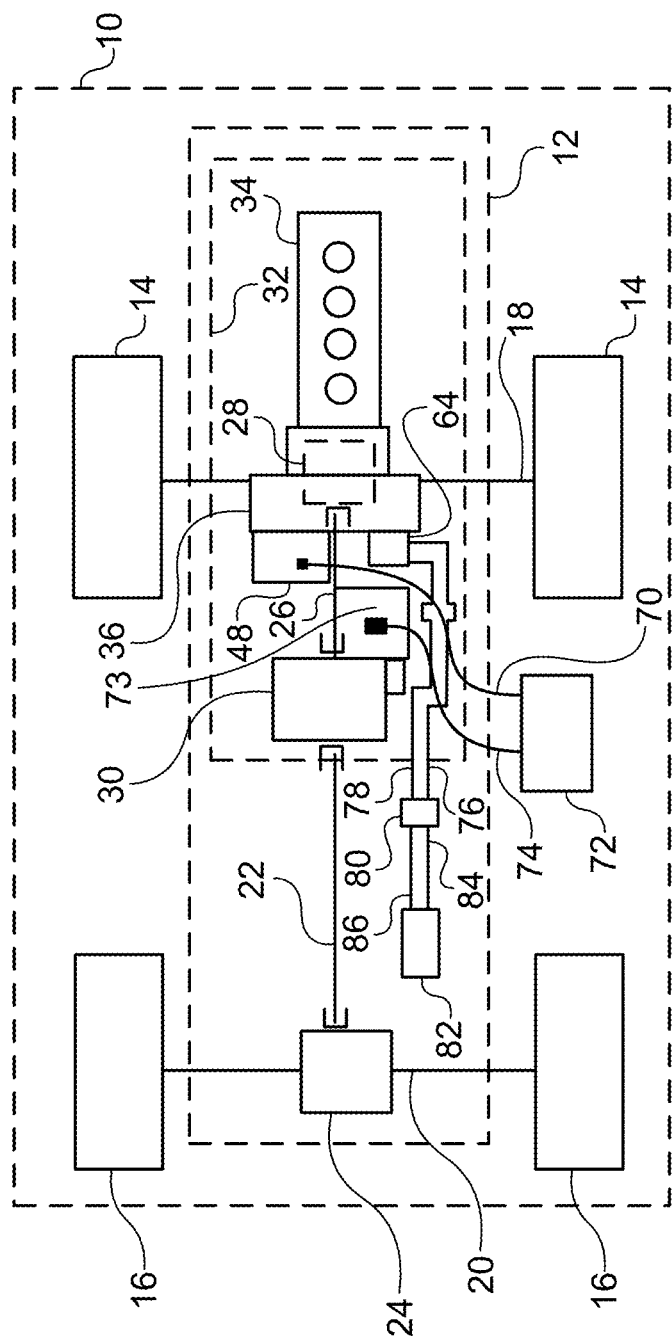
FIG. 1 is overall schematic drawing of a work machine incorporating the present invention.

Referring now to the drawings, and more particularly to FIG. 1 there is illustrated in schematic fashion a work machine 10 embodying the present invention. The work machine 10 includes a frame 12 supporting in usual fashion a set of rear wheels 14 and front wheels 16. The rear wheels 14 are supported on axle 18 and the front wheels 16 on the front axle 20 in usual fashion. In a typical work machine arrangement, the one set of the wheels is steerable to provide directional control for the work machine 10. These details have been omitted, however, to provide a better understanding of the invention. A front drive shaft 22 extends to a front differential 24 for the front axle 20 and a rear drive shaft 26 extends to a rear differential 28 (usually mounted under an engine) for the rear axle 18. The purpose of the differentials is to permit differential rotation of the wheels as the work machine 10 traverses a corner. The front and rear drive shafts 22 and 26, respectively, connect to a transmission 30 which may be anyone of a number of types of transmission providing a rotary output to the various drive shafts.

The work machine 10 has an engine compartment 32 in which an internal combustion engine 34 is mounted. Internal combustion engine 34 is of preferably of the diesel engine type owing to its fuel economy reliability and height work output. It should be apparent that other engine types may be used to similar advantage. The engine compartment 32 in typical work machines is constrained by an overall volume requirement. This is because the work machine typically must carry a variety of accessory equipment such as backhoes, loaders, agricultural processing equipment, and PTOs. More and more space is taken up by these items thus forcing the engine compartment to be as compact in volume as possible. This is contrast to highway vehicles of the heavy duty type in which plenty of room is available for the simple mission of propelling the vehicle down the road. One of the other duty requirements that have occurred with diesel engines in particular for work machines is that the EPA emission limits for on-highway vehicles are being passed onto off-highway vehicles, or work machines. As a result, the emission control of the diesel engine becomes exceedingly complex and imposes operating restraints that have heretofore not been experienced. One of the ways to provide the diesel engine operation in a duty cycle that minimizes emissions is to use a generator motor combination so that the diesel engine may be operated at its optimum RPM/load combination while the variation in RPM is taken up between the generator and motor. When the additional bulk of the generator and the motor are put into an existing engine compartment, there is an extremely burdensome requirement for additional space.

Figure 2:
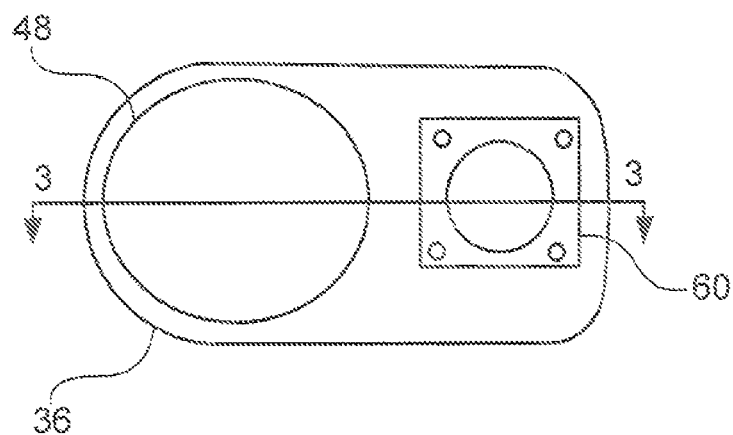
FIG. 2 is a view of a gear housing incorporated in FIG. 1.
Figure 3:
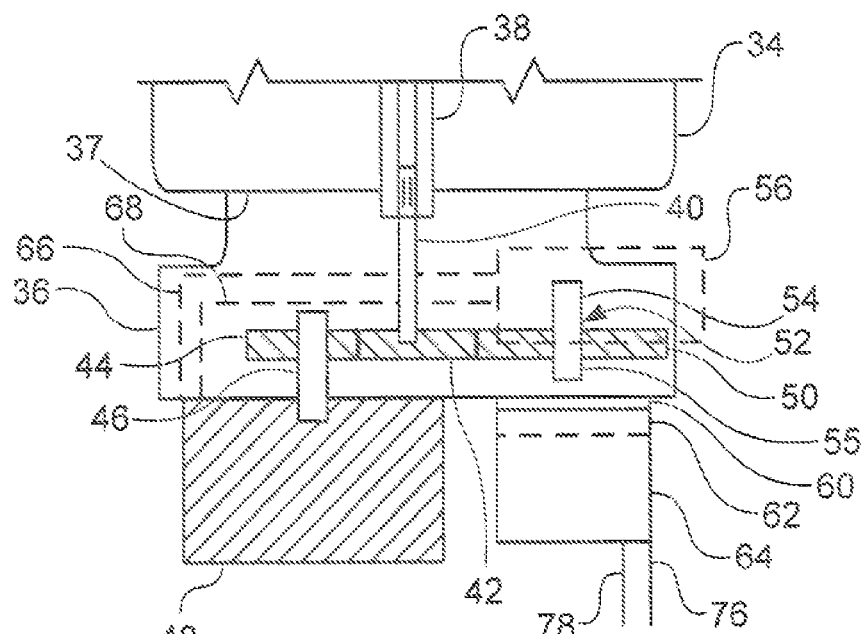
FIG. 3 is a section view of the gear housing of FIG. 3 taken on line 3-3 of FIG. 2.

In accordance with the present invention, these problems are eliminated by providing the gear housing 36 shown in detail in FIGS. 2 and 3. As particularly illustrated in FIGS. 2 and 3, the housing 36 is adapted to mount to the internal combustion engine 34 by a mounting flange 37 that is normally used in to mount a flywheel housing to the internal combustion engine. Mounting flange 37 surrounds a boundary for engine output shaft 38 which carries the primary output of engine 34. Housing 36 is removably mounted to the internal combustion engine 34 by appropriate fasteners.

An input shaft 40 is journaled within gear housing 36 about an axis coaxial with engine output shaft 38. Input shaft 40 has a first gear 42 mounted to one end thereof. First gear 42 meshes with a second gear 44 contained substantially within the same plane as first gear 42. Second gear 44 has a first output shaft 46 which drives a generator 48 appropriately mounted to the exterior of gear housing 36. A third gear 50 meshes with first gear 42 and also is in substantially the same plane as first gear 42. Third gear 50 has a second output shaft 52 having a first internal extending shaft 54 which is used to drive an internal lubricating pump 56. The journaling and lubrication of gears 42, 44 and 50 and their appropriate shafts has not been shown in order to simplify the understanding of the present invention. It should be noted that such features may be easily employed by those skilled in the art to provide the working assembly.

The outer end 55 of second output shaft 52 extends into a mounting flange 60 providing for an external hydraulic drive from gear housing 36. Mounting flange 60 may be covered by a plate 62, (shown by a dashed line 60) if such a unit is not utilized, but, as illustrated, a hydraulic pump 64 is provided. A lubricant supply passage 66 and lubricant return passage 68 is illustrated schematically for connecting the generator 48 with the lubricant supply pump. The passages 66 and 68 may be external or internal as appropriate for the installation. The lubricant provided by pump 56 is used to lubricate the gears 42, 44 and 50 and their associated shafts as well as lubricate the generator 48 and provide cooling for generator 48 as appropriate. It should be noted that with the gears 42, 44 and 50 being substantially in the same plane, the axial length taken up by the gear housing 36 is substantially minimized and is no greater than the components it replaces. In addition, as illustrated, the second and third gears may be 180 degrees apart with respect to the first gear 42 and on either side to minimize the vertical space taken up by the gear housing 36 and associated driven assemblies.

The generator 48, as shown particularly in FIG. 1 has an electrical output line 70 leading to a controller 72 and then to the motor 73 which, in turn, is connected to and drives the transmission 30. The controller 72, in usual fashion, uses appropriate electronic and electrical control techniques to provide the desired current and frequency for maintaining the motor 26 at a predetermined or preselected RPM to drive the transmission. This enables the engine 34 to be operated at its optimum for emissions while the variations and RPM are taken up by the motor generator combination 26/48.

When the hydraulic pump 64 is incorporated, a hydraulic pressure line 76 and hydraulic fluid return line 78 extend between the hydraulic pump 64 and a hydraulic controller 80. Hydraulic controller 48, in turn, is connected to a hydraulic load 82 by a hydraulic supply line 84 and a return line 86. The hydraulic load 82 may be anyone of a number of items and may include steering, buckets and other mechanisms typically found within work machines.

The work machine described above provides an engine compartment volume efficiency that enables the use of a motor/generator combination within a work machine within the constraints of preexisting engine compartments. As a result, it enables the achievement of decreased emissions while providing equivalent reliability, power output and efficiency.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A work machine, comprising:
   a frame;
   a plurality of ground wheels supported by said frame for ground movement;
   a transmission system for connecting a rotary input to at least one of said ground wheels;
   an engine compartment within said frame, said engine compartment being constrained by available space to provide a minimal overall volume;
   an internal combustion (IC) engine mounted within said engine compartment and having a rotary power output shaft bounded by a flange to which a flywheel housing can be mounted;
   a gear housing having a flange corresponding to and mounted on said engine flange;
   an input shaft journaled within said gear housing and connected at one end to the rotary power output shaft of said engine, said input shaft having a first gear mounted thereto;
   a second gear journaled in said gear housing about an axis parallel to the axis of said input shaft, said second gear being substantially in the same plane as and being driven by said first gear and, said second gear having a first output shaft;
   a generator mounted to the exterior of said gear housing and being driven by said first output shaft to produce an electrical output in response to the power input of said IC engine;
   a third gear journaled in said gear housing about an axis parallel to axis to said input shaft, said third gear being substantially in the same plane as and being driven by said first gear, said second gear having a second output shaft having an interim contained within said gear housing and an outer end adapted to drive an externally mounted load; and,
   an electric motor connected to the rotary input of said transmission and receiving a controlled electrical input from said generator for driving said transmission,
   whereby said generator and motor fit within a minimal volume.

2. The work machine as claimed in claim 1, further comprising of a lubricant pump contained within said housing and driven by the inner end of said second output shaft, said providing lubrication of said of the gears within said housing.

3. The work machine of claim 2, further comprising a means for connecting lubricant from said internal lubricant pump to said generator for at least one of lubrication and cooling thereof.

4. The work machine of claim 1, further comprising a hydraulic pump connected to the exterior of said gear housing and driven by the outer end of said second output shaft.

5. The work machine of claim 4, further comprising an external hydraulic load, said external hydraulic load being provided with hydraulic fluid from said external hydraulic pump.

6. The work machine of claim 5, wherein the load is one of at least steering for said work machine and an accessory load.

7. The work machine as claimed in claim 1, wherein said IC engine is a diesel engine operating at an RPM and load producing minimal emissions whereby the variation in RPM is primarily produced by the variation in the output of the said electrical motor.

8. The work machine as claimed in claim 1, wherein said work machine has four wheels and said transmission system drives all of said four wheels.

9. The work machine as claimed in claim 1, wherein said gears said first and second gears within said gear housing are approximately 180 degrees apart and on either side of said first gear within said gear housing.

\* \* \* \* \*